US009602724B2

(12) United States Patent  
Sugaya

(10) Patent No.: US 9,602,724 B2  
(45) Date of Patent: Mar. 21, 2017

(54) IMAGE CAPTURING APPARATUS AND IMAGE CAPTURING METHOD

(71) Applicant: CANON KABUSHIKI KAISHA, Tokyo (JP)

(72) Inventor: Tomohiro Sugaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 14/492,732

(22) Filed: Sep. 22, 2014

(65) Prior Publication Data  
US 2015/0085138 A1    Mar. 26, 2015

(30) Foreign Application Priority Data

Sep. 24, 2013  (JP) ................................ 2013-197506  
Jul. 22, 2014  (JP) ................................ 2014-149163

(51) Int. Cl.  
*H04N 3/233*     (2006.01)  
*H04N 5/232*     (2006.01)

(52) U.S. Cl.  
CPC ..... *H04N 5/23245* (2013.01); *H04N 5/23219* (2013.01); *H04N 5/23254* (2013.01); *H04N 5/23267* (2013.01); *H04N 5/23287* (2013.01)

(58) Field of Classification Search  
CPC ........... H04N 5/23245; H04N 5/23219; H04N 5/23264; H04N 5/2328; H04N 5/23287  
See application file for complete search history.

(56) References Cited

U.S. PATENT DOCUMENTS

2006/0127071 A1*  6/2006  Takeuchi ............. G02B 27/646  
                                                                                  396/55  
2012/0033092 A1*  2/2012  Sugaya .............. H04N 5/23254  
                                                                               348/208.1

FOREIGN PATENT DOCUMENTS

JP     2010-093362 A    4/2010  
JP     2010-114752 A    5/2010

OTHER PUBLICATIONS

Morio Ogami et al., in Joho-shori vol. 17, No. 7, p. 634 to 640, Jul. 1976.

* cited by examiner

*Primary Examiner* — Christopher Findley  
(74) *Attorney, Agent, or Firm* — Cowan, Liebowitz & Latman, P.C.

(57) ABSTRACT

An image capturing apparatus comprises an object detection unit configured to detect a predetermined object and a movement amount acquisition unit configured to acquire an amount of movement of the predetermined object. An object tracking unit suppresses the amount of movement of the predetermined object by moving an optical element constituting an image capturing optical system. A motion vector detection unit detects a motion vector indicating an image blur amount. An image blur correction unit corrects image blur based on the motion vector. A switching unit switches whether or not to perform object tracking using the object tracking unit. The image blur correction unit makes effect of the image blur correction in a case of performing the object tracking smaller than effect of the image blur correction in a case of not performing the object tracking.

8 Claims, 12 Drawing Sheets

F I G. 5
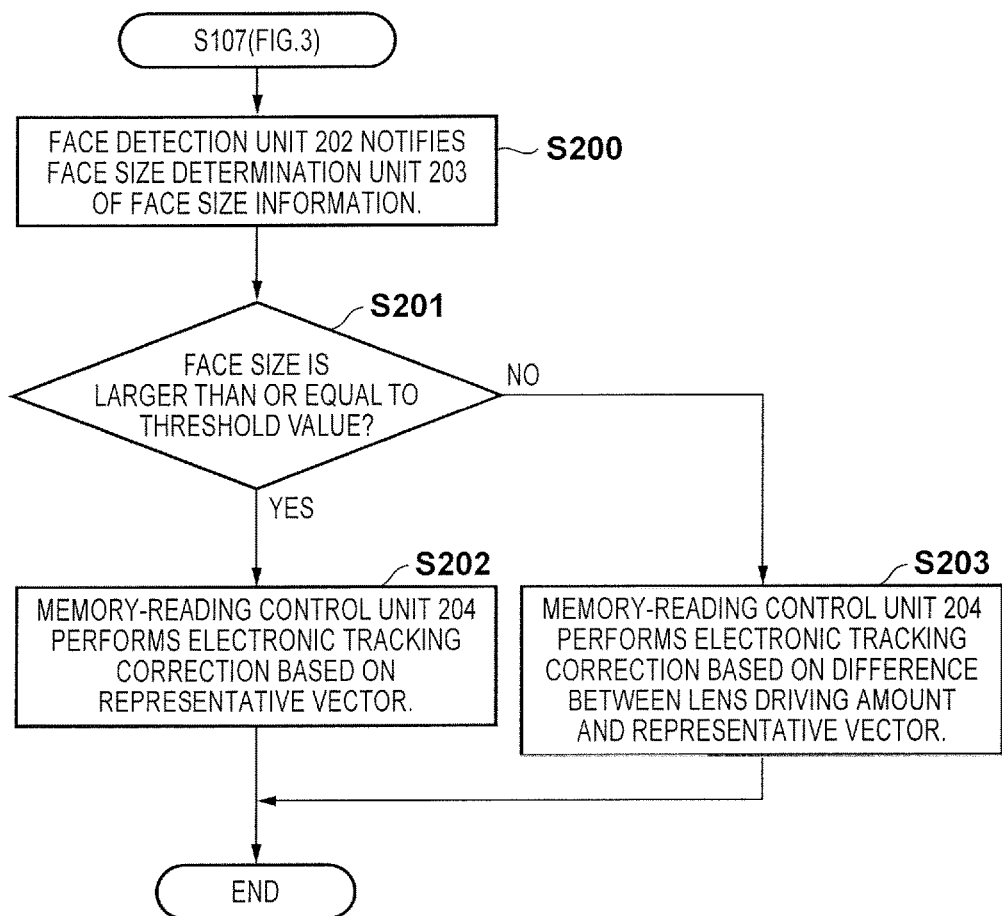

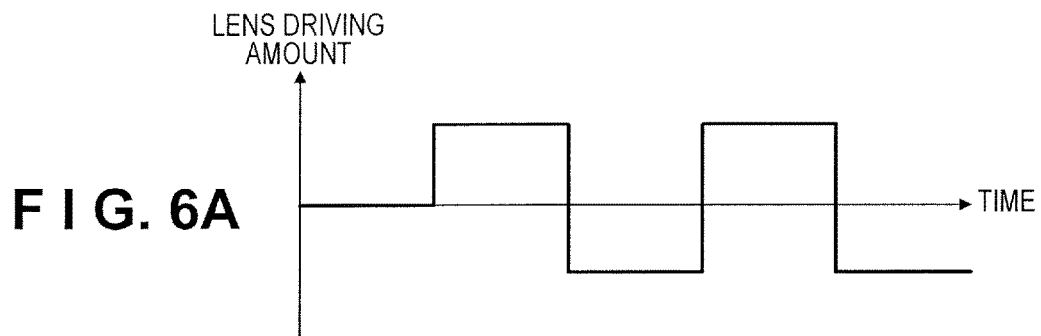
F I G. 6A
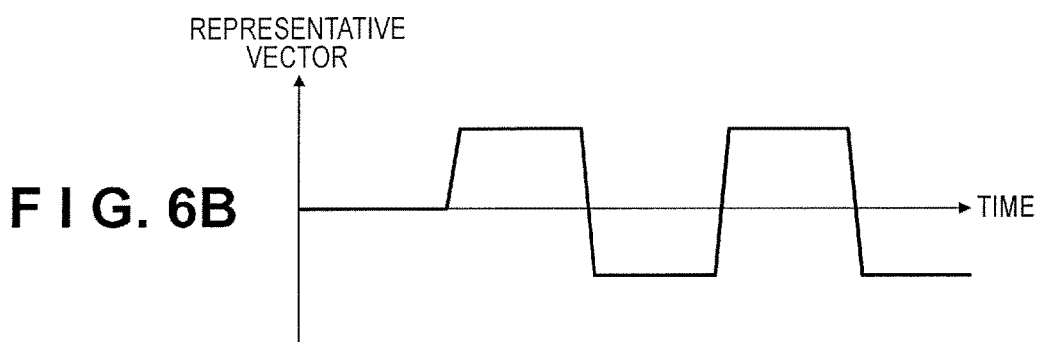
F I G. 6B
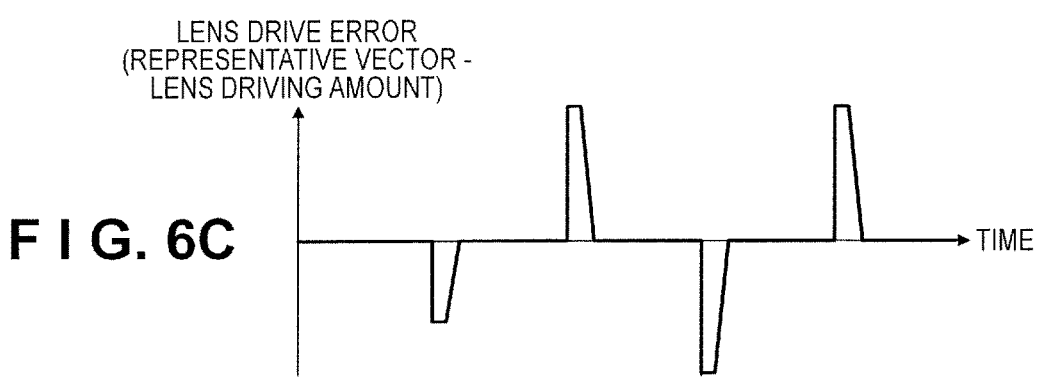
F I G. 6C

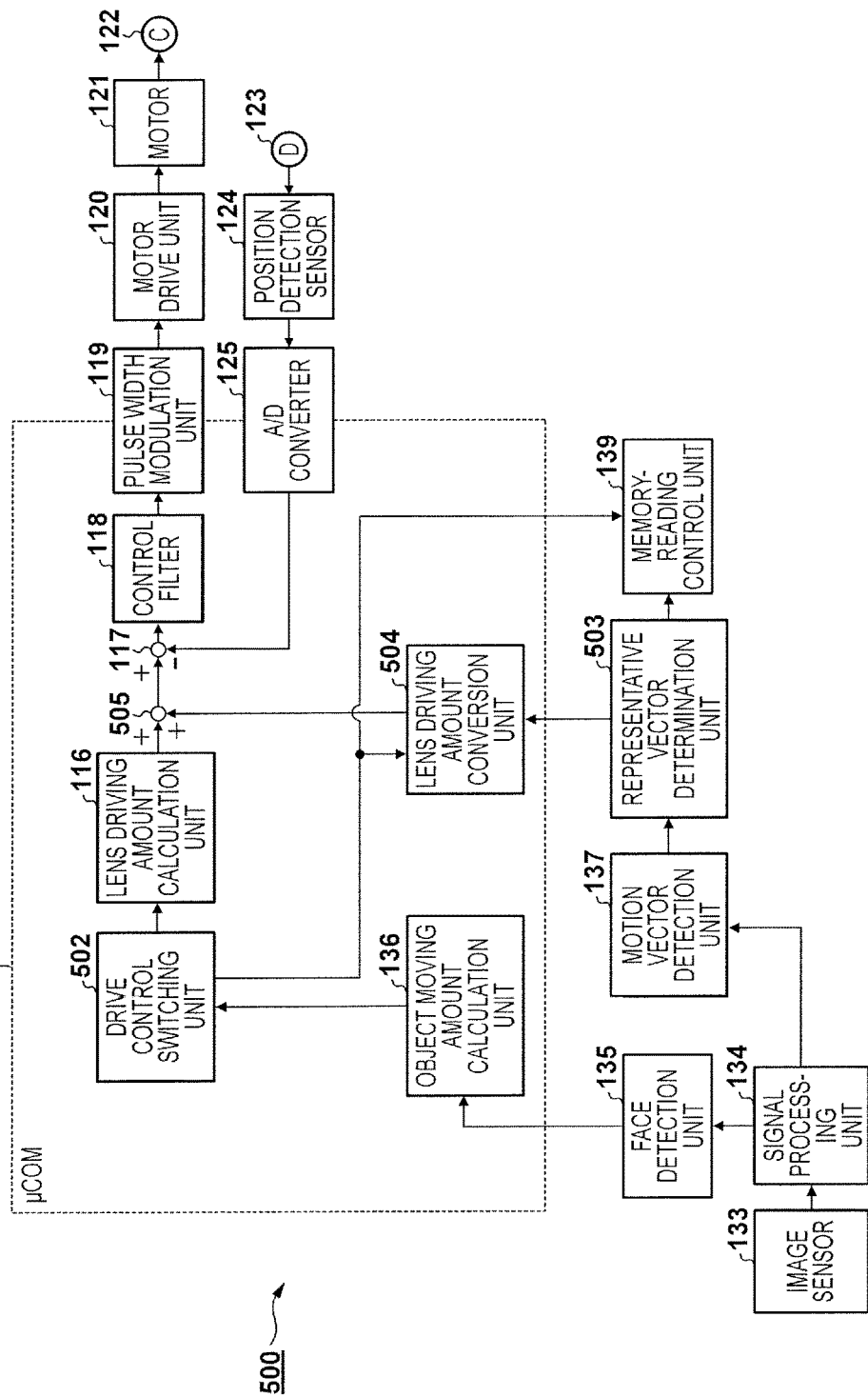

IMAGE CAPTURING APPARATUS AND IMAGE CAPTURING METHOD

BACKGROUND OF THE INVENTION

Field of the Invention

The present invention relates to an image capturing apparatus and an image capturing method.

Description of the Related Art

In recent years, various functions for assisting shooting in an image capturing apparatus, such as a digital video camera, have been proposed. For example, blur correction functions are installed in many image capturing apparatuses, and are classified into optical blur correction and electronic blur correction, depending on the correction method. The optical blur correction is a method in which a shake of an image capturing apparatus is detected, and a change of the optical axis due to the shake is cancelled by displacing a correction lens, which is part of an image capturing optical system, based on the detected shake. The electronic blur correction is a method in which a shake of an image capturing apparatus is detected using a motion vector in a captured image, and when an image for recording is generated using a captured image in an image memory, a position of the image memory from which the captured image is read out is changed so as to correct a shift between frames caused by the shake of the image capturing apparatus.

A function of performing object tracking using the correction lens used in the optical blur correction in order to include a moving object within a screen has also been proposed as a shooting assist function. Japanese Patent Laid-Open No. 2010-093362discloses a technique of using a blur correction lens to perform object tracking in order to include a main object within an angle of view until shooting is started, and switching control of the correction lens so as to use the blur correction lens to perform blur correction during shooting.

However, if the blur correction lens is moved with movement of the main object position, the position of an object (e.g., a still object such as one in the scenery) other than the main object within the screen changes, and accordingly this change is detected as a motion vector. If the electronic blur correction based on this motion vector is performed, the object tracking does not function correctly. The details will now be described, taking FIGS. 1A to 1E as an example.

FIG. 1A shows an image captured when the positional relationship between an image capturing apparatus and objects is in a state shown in FIG. 1B, and similarly, FIG. 1C shows an image captured when the positional relationship between an image capturing apparatus and objects is in a state shown in FIG. 1D. FIG. 1E shows a motion vector calculated from the images in FIGS. 1A and 1C. Note that regions divided in a lattice pattern within a motion vector detection area in FIG. 1A indicate blocks used in a later-described block matching method. A motion vector shown in FIG. 1E is a representative vector indicating movement of the entire screen calculated from motion vectors detected in the blocks.

As shown in FIG. 1A, a person, who is the main object in the captured image, is located at the center of the captured image. Here, if the person moves as shown in FIGS. 1B and 1D and the correction lens is driven so as to track the main object, the optical axis is inclined, and the person continues to be located at the center of the captured image as shown in FIG. 1C. In this case, the position of the scenery (building and tree in FIG. 1C) excluding the person in the captured image changes from the position in FIG. 1A to the position in FIG. 1C. Since the region other than the region of the person (blocks with a diagonal line in FIG. 1E) occupies large part of the captured image, the representative vector based on the change of the position in the background (scenery) is calculated as shown in FIG. 1E.

Here, as the electronic blur correction function, a method is widely used in which image blur is detected using a representative vector and the position of the image memory from which the captured image is read out is changed based on the representative vector. If this electronic blur correction function changes the position of the image memory from which the captured image is read out, based on the representative vector detected as a result of the background position changing when object tracking is performed using the correction lens as mentioned above, it may possibly interfere with the object tracking.

SUMMARY OF THE INVENTION

The present invention has been made in view of the foregoing situation, and provides a technique for suppressing an image blur correction function interfering with object tracking when an image capturing apparatus having the image blur correction function performs object tracking using its optical system.

According to an aspect of the present invention, there is provided an image capturing apparatus comprising: an object detection unit configured to detect a predetermined object in a captured image that is captured by an image sensor; a movement amount acquisition unit configured to acquire an amount of movement of the predetermined object that moves in an image capturing screen, from two captured images that are captured by the image sensor; an object tracking unit configured to suppress the amount of movement of the predetermined object in the image capturing screen, by moving an optical element in a direction that is different from a direction of an optical axis of an image capturing optical system that guides a light beam toward the image sensor, the optical element constituting the image capturing optical system; a motion vector detection unit configured to compare two captured images that are captured by the image sensor and detect a motion vector indicating an image blur amount; an image blur correction unit configured to correct image blur, based on the motion vector; and a switching unit configured to switch whether or not to perform object tracking using the object tracking unit, wherein the image blur correction unit makes effect of the image blur correction in a case of performing the object tracking smaller than effect of the image blur correction in a case of not performing the object tracking.

According to another aspect of the present invention, there is provided an image capturing method comprising: an object detection step of detecting a predetermined object in a captured image that is captured by an image sensor; a movement amount acquisition step of acquiring an amount of movement of the predetermined object that moves in an image capturing screen, from two captured images that are captured by the image sensor; an object tracking step of suppressing the amount of movement of the predetermined object in the image capturing screen, by moving an optical element in a direction that is different from a direction of an optical axis of an image capturing optical system that guides a light beam toward the image sensor, the optical element constituting the image capturing optical system; a motion vector detection step of comparing two captured images that are captured by the image sensor and detecting a motion vector indicating an image blur amount; an image blur correction step of correcting image blur, based on the motion vector; and a switching step of switching whether or not to perform object tracking in the object tracking step, wherein in the image blur correction step, effect of the image blur correction in a case of performing the object tracking is made smaller than effect of the image blur correction in a case of not performing the object tracking.

Further features of the present invention will become apparent from the following description of exemplary embodiments with reference to the attached drawings.

BRIEF DESCRIPTION OF THE DRAWINGS

FIG. 5 is a flowchart showing electronic tracking correction processing executed by the image capturing apparatus 200.

FIGS. 6A to 6C are diagrams illustrating lens drive error in an object tracking mode.

FIG. 12 is a block diagram showing a configuration of an image capturing apparatus 500 according to the fifth embodiment.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First, the definition of terms will be described. In the present specification, a vibration applied to an image capturing apparatus will be referred to as a "shake", and a shift of an object position between frames of a captured image generated due to the shake, or blurring of an object image, will be referred to as "blur".

First Embodiment

Figure 1A:
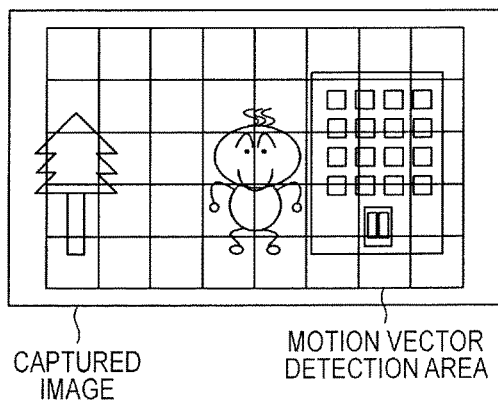
FIGS. 1A to 1E are conceptual diagrams illustrating a reason why electronic blur correction interferes with object tracking.
Figure 1B:
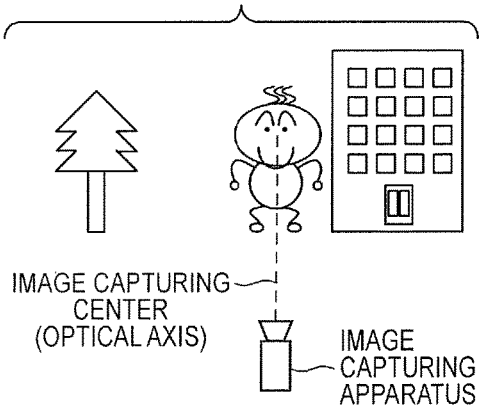
Figure 1C:
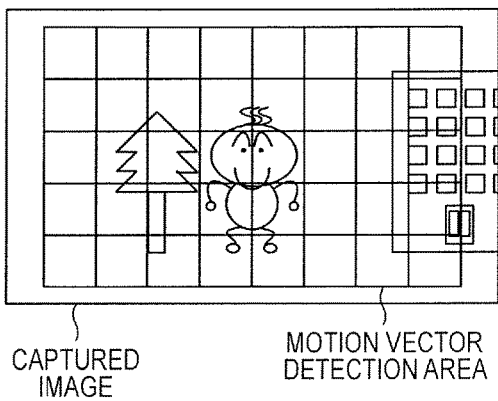
Figure 1D:
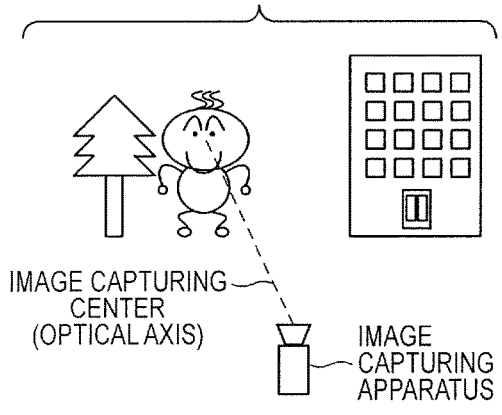
Figure 1E:
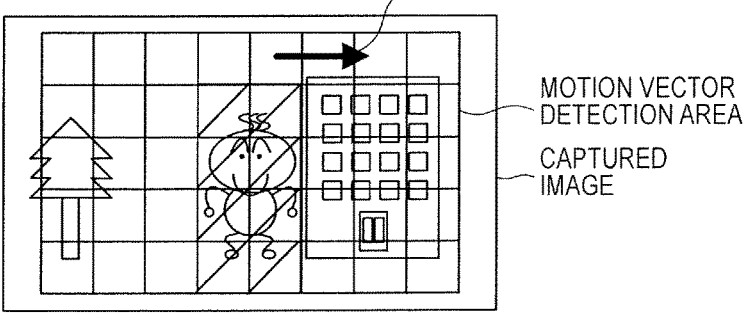
Figure 2:
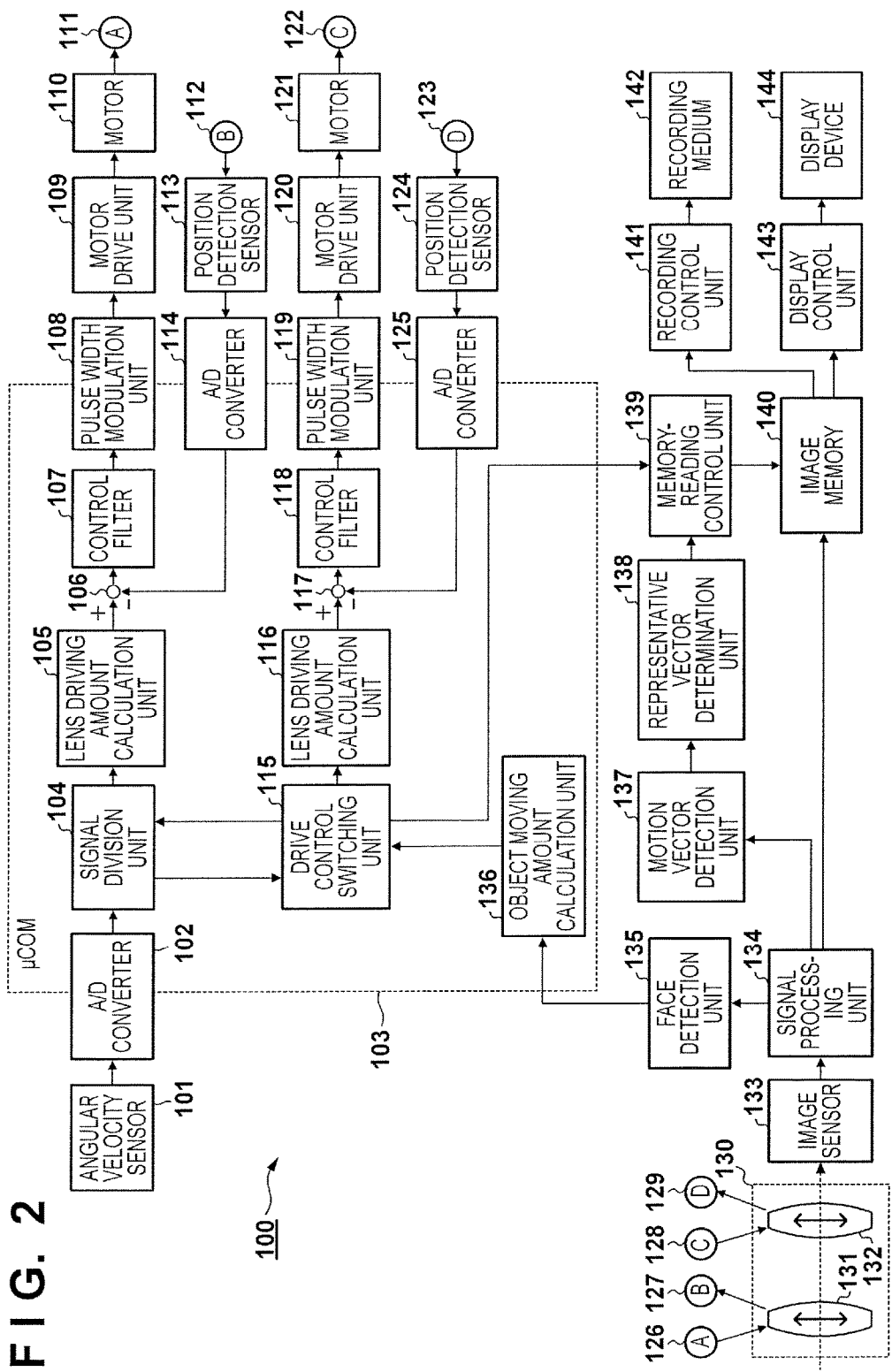
FIG. 2 is a block diagram showing a configuration of an image capturing apparatus 100 according to the first embodiment.

An embodiment of the present invention will be described. FIG. 2 is a block diagram showing a configuration of an image capturing apparatus 100 according to the first embodiment. Each constituent unit of the image capturing apparatus 100 in FIG. 2 and exemplary operations thereof will now be specifically described.

The image capturing apparatus 100 has two correction lenses (image blur correction lenses), namely a correction lens 131 and a correction lens 132 that are able to vertically move with respect to the optical axis of an image capturing optical system, and uses the correction lens 131 to perform optical blur correction. The image capturing apparatus 100 can select a blur correction mode or an object tracking mode as a control mode for the correction lens 131. In the case of the blur correction mode, the image capturing apparatus 100 uses the correction lens 132 to perform optical blur correction control. In the case of the object tracking mode, the image capturing apparatus 100 uses the correction lens 132 to perform object tracking control.

First, the optical blur correction using the correction lens 131 will be described. An angular velocity sensor 101 detects a shake applied to the image capturing apparatus 100 as an angular velocity signal, and supplies this angular velocity signal to an A/D converter 102. The A/D converter 102 digitalizes the angular velocity signal supplied from the angular velocity sensor 101, and supplies the digitalized angular velocity signal to a signal division unit 104 within a μCOM (microcomputer) 103. In the following description, the digitalized angular velocity signal will be expressed as "angular velocity data".

The signal division unit 104 receives information indicating the current control mode for the correction lens 132 of which a drive control switching unit 115 notifies the signal division unit 104, and switches output in accordance with the control mode. In the case of the object tracking mode, the optical blur correction based on the angular velocity data is performed only by the correction lens 131, and accordingly the signal division unit 104 outputs the angular velocity data to a lens driving amount calculation unit 105 without dividing the angular velocity data. On the other hand, in the case of the blur correction mode, the optical blur correction is performed using two correction lenses, namely the correction lens 131 and the correction lens 132, and accordingly the signal division unit 104 divides the angular velocity data and outputs the divided angular velocity data to the lens driving amount calculation unit 105 and the drive control switching unit 115. The details of the signal division unit 104 will be described later. In both cases of the blur correction mode and the object tracking mode, the lens driving amount calculation unit 105 calculates a driving amount by which the correction lens 131 is driven, based on the angular velocity data output by the signal division unit 104, and outputs the calculated driving amount to a subtracter 106.

The subtracter 106 outputs, to a control filter 107, deviation data obtained by subtracting later-described lens position data from the output of the lens driving amount calculation unit 105. The control filter 107 includes an amplifier that amplifies input data at a predetermined gain, and a phase compensation filter. The deviation data supplied from the subtracter 106 undergoes signal processing performed by the amplifier and the phase compensation filter in the control filter 107, and is thereafter output to a pulse width modulation unit 108.

The pulse width modulation unit 108 modulates the data that is supplied thereto after passing through the control filter 107, into a waveform (i.e., a PWM waveform) that changes the duty ratio of a pulse wave, and supplies the waveform to a motor drive unit 109. A motor 110 is a voice coil motor for driving the correction lens 131. As a result of the motor 110 being driven by the motor drive unit 109, the correction lens 131 is moved in a direction vertical to the optical axis. Here, it is indicated that a terminal A111 and a terminal A126 are electrically connected to each other. It is also indicated that a terminal B112 and a terminal B127 are electrically connected to each other.

A position detection sensor 113 includes a magnet and a Hall sensor provided at a position opposite to the magnet, detects the amount of movement of the correction lens 131 in a direction vertical to the optical axis, and outputs the detection result to an A/D converter 114. The A/D converter 114 converts a detection signal of the position detection sensor 113 into lens position data, which is digital data, and supplies the lens position data to the aforementioned subtracter 106. Thus, a feedback control system for causing the amount of movement of the correction lens 131 in a direction vertical to the optical axis to follow the output of the lens driving amount calculation unit 105 is configured.

The correction lens 131 is a shift lens, for example, and is an optical system that deflects the optical axis by being moved on a vertical plane with respect to the optical axis and is capable of blur correction. As a result of the correction lens 131 being moved, an image in which blur of an object in the vertical and horizontal directions on the image capturing surface generated due to a shake of the image capturing apparatus 100 has been corrected is formed in the image sensor 133.

Here, the content of processing of another correction lens control system, that is, units from a lens driving amount calculation unit 116 to an A/D converter 125 is basically the same as that of processing of the units from the lens driving amount calculation unit 105 to the A/D converter 114, and a detailed description thereof will be omitted accordingly. However, since data to be input from the drive control switching unit 115 to the lens driving amount calculation unit 116 is different in the case of the blur correction mode and in the case of the object tracking mode, and consequently the control of the correction lens 132 is also different. Processing related to the switching of the control mode will be described later in detail.

Processing for storing and displaying a captured image will be described below. Processing for detecting a face position in a captured image and processing for detecting a motion vector will also be described.

The image sensor 133 converts an object image formed by an image capturing optical system 130 including the correction lens 131 and the correction lens 132 into an electric signal serving as a captured image signal, and supplies the electric signal to a signal processing unit 134. The signal processing unit 134 generates a video signal (picture signal) conforming to the NTSC format, for example, using the signal obtained by the image sensor 133, and supplies the video signal to an image memory 140. The signal processing unit 134 also supplies the video signal to a face detection unit 135 and a motion vector detection unit 137. However, the video signal supplied to the face detection unit 135 and the motion vector detection unit 137 does not have to be the same as the video signal supplied to the image memory 140.

The face detection unit 135 performs object detection processing in which a region of the face (predetermined object) of a person within a shooting screen is detected by performing any known face recognition processing on the video signal. The face detection unit 135 then supplies the detection result to an object movement amount calculation unit 136. The object movement amount calculation unit 136 performs movement amount acquisition processing for calculating the amount of movement of the person during a period from the previous captured image to the current captured image, based on the position of the face region of the person detected by the face detection unit 135. The object movement amount calculation unit 136 then supplies the calculation result as object movement amount data to the drive control switching unit 115.

The motion vector detection unit 137 holds the video signal that is output from the signal processing unit 134 in a memory (not shown) in order to delay the video signal by one field (or one frame). The motion vector detection unit 137 then detects a motion vector, based on luminance signals of two images, which are the image (first captured image) of the video signal acquired in the current image capturing and the image (second captured image) of the previous field (or the previous frame) acquired in the previous image capturing.

As a specific method for detecting a motion vector, for example, a conventionally-proposed block matching method or the like is used. The block matching method is a method in which a captured image is divided into regions called blocks, and a similar portion in a captured image in the previous frame and in the current captured image is detected in units of blocks, for example. In an arbitrary area within the captured image in the previous frame, a portion with the largest value of correlation with an arbitrary block in the current captured image is detected as a similar block position. Information regarding movement between the captured image frames, that is, a motion vector is detected by obtaining the amount of displacement between the arbitrary block position in the current captured image and the similar block position in the captured image in the previous frame.

Note that the block matching method is an exemplary motion vector detection method used in the motion vector detection unit 137, and a method other than the block matching method may also be used as the motion vector detection method. The matching calculation is discussed in detail by Morio Ogami et al., in *Joho-shori* Vol. 17, No. 7, p. 634 to 640, July 1976.

A representative vector determination unit 138 calculates a representative vector that indicates movement of the entire image, from a plurality of motion vectors detected by the motion vector detection unit 137, and supplies the calculated representative vector to a memory-reading control unit 139. Note that a representative vector calculation method may be a method of using the median or the average of a plurality of motion vectors in the respective blocks as the representative vector. Hereinafter, the term "motion vector" indicates the representative vector in some cases.

The memory-reading control unit 139 controls the position of the image memory 140 from which the captured image is read out so as to cancel image movement, in accordance with the motion vector detected by the representative vector determination unit 138. Thus, a video signal (output image) in which blur has been corrected is output from the image memory 140. The method of correcting blur by thus performing output image acquisition processing while changing the position of the image memory 140 from which the captured image is read out is called electronic blur correction. In the present embodiment, the image capturing apparatus 100 performs the electronic blur correction in the case of the blur correction mode, and does not perform the electronic blur correction in the case of the object tracking mode. For this reason, the memory-reading control unit 139 changes processing in accordance with the control mode for the correction lens 132 determined by the drive control switching unit 115. The details of this processing will be described later.

The video signal that is output from the image memory 140 is supplied to a recording control unit 141 and a display control unit 143. If an instruction to record a picture signal is given by an operation unit (not shown) that is used to give instructions to start and end recording, the recording control unit 141 outputs the video signal supplied from the image memory 140 to a recording medium 142 to record the video signal therein. The recording medium 142 is an information recording medium such as a semiconductor memory, or a magnetic recording medium such as a hard disk. The display control unit 143 outputs the video signal supplied from the image memory 140 and causes a display device 144 to display the image. The display control unit 143 drives the display device 144, and the display device 144 displays the image using a liquid-crystal display device (LCD) or the like.

The processing executed by the image capturing apparatus 100 in accordance with the switching of the control mode for the correction lens 132 will now be described with reference to FIG. 3. Here, prior to the description of the flowchart, a specific exemplary method for selecting the control mode to be the switching destination will be described. In an example, the image capturing apparatus 100 has a menu from which the blur correction mode or the object tracking mode can be selected. If a photographer selects the blur correction mode from the menu, the drive control switching unit 115 switches the control mode to the blur correction. If the photographer selects the object tracking mode, the drive control switching unit 115 switches the control mode to the object tracking. In another example, upon the photographer selecting an object that he/she wants the image capturing apparatus 100 to track, through an operation to a touch panel or the like, the drive control switching unit 115 switches the control mode from the blur correction mode to the object tracking mode. In still another example, if the face detection unit 135 detects a tracking target object, such as a person, the drive control switching unit 115 switches the control mode to the object tracking mode, and if the face detection unit 135 cannot detect a tracking target object, the drive control switching unit 115 switches the control mode to the blur correction mode.

Upon the drive control switching unit 115 switching the control mode for the correction lens 132 between the blur correction mode and the object tracking mode, the processing of the present flowchart is started. In step S100, the drive control switching unit 115 notifies the signal division unit 104 and the memory-reading control unit 139 of the current control mode for the correction lens 132.

In step S101, the processing branches depending on whether the current control mode is the blur correction mode or the object tracking mode. In the case of the blur correction mode, the processing proceeds to step S102, and in the case of the object tracking mode, the processing proceeds to step S105.

In step S102, the signal division unit 104 starts the operation conforming to the control mode of which the signal division unit 104 is notified by the drive control switching unit 115 in step S100. Specifically, the signal division unit 104 divides the angular velocity data and outputs the divided angular velocity data to the lens driving amount calculation unit 105 and the drive control switching unit 115. In an exemplary method for dividing the angular velocity data, the output to the lens driving amount calculation unit 105 is a value obtained by multiplying the angular velocity data by a predetermined coefficient n (n<1), and the output to the drive control switching unit 115 is a value obtained by multiplying the angular velocity data by a coefficient (1−n). In another exemplary method for dividing the angular velocity data, the signal division unit 104 has a function of a low pass filter or a high pass filter, performs frequency separation on the angular velocity data, uses a low-frequency signal as one output, and uses a high-frequency signal as the other output.

In step S103, the drive control switching unit 115 starts the operation conforming to the control mode. Specifically, the drive control switching unit 115 outputs the divided angular velocity data supplied from the signal division unit 104, to the lens driving amount calculation unit 116. At this time, the drive control switching unit 115 nullifies the object movement amount data supplied from the object movement amount calculation unit 136. Thus, the correction lens 132 is driven based only on the divided angular velocity data, and the optical blur correction is performed by the correction lens 132. In this manner, the optical blur correction using the two correction lenses is realized by driving the correction lens 131 based on one output of the divided angular velocity data, and driving the correction lens 132 based on the other output.

In step S104, the memory-reading control unit 139 starts the operation conforming to the control mode of which the memory-reading control unit 139 is notified by the drive control switching unit 115 in step S100. Specifically, the memory-reading control unit 139 controls the position of the image memory 140 from which the image is read out, based on the motion vector (representative vector) supplied from the representative vector determination unit 138. Thus, image blur caused by correction error in the optical blur correction can be further corrected by the electronic blur correction.

On the other hand, in the case of the object tracking mode, in step S105, the signal division unit 104 starts the operation conforming to the control mode of which the signal division unit 104 is notified by the drive control switching unit 115 in step S100. Specifically, the signal division unit 104 outputs the angular velocity data supplied from the A/D converter 102 to the lens driving amount calculation unit 105 without dividing the angular velocity data. At this time, the signal division unit 104 outputs 0, an invalid value, or the like to the drive control switching unit 115 such that the drive control switching unit 115 does not use the output of the signal division unit 104.

In step S106, the drive control switching unit 115 starts the operation conforming to the control mode. Specifically, the drive control switching unit 115 nullifies the data supplied from the signal division unit 104, and outputs the object movement amount data that is output from the object movement amount calculation unit 136, to the lens driving amount calculation unit 116. Since the correction lens 132 is thereby driven in accordance with the movement of the object and deflects its optical axis, the object position settles at a substantially fixed position within the image even if the object moves.

In step S107, the memory-reading control unit 139 starts the operation conforming to the control mode of which the memory-reading control unit 139 is notified by the drive control switching unit 115 in step S100. Specifically, the memory-reading control unit 139 does not cause the electronic blur correction to be performed. That is to say, in order that the position from which the image is read out from the image memory 140 is not changed, the memory-reading control unit 139 sets a predetermined fixed position as the image readout position. As a result of stopping the electronic blur correction through the processing in step S107, it is possible to prevent erroneous correction that prompts, by means of the electronic blur correction, to suppress a background position change caused by the object tracking of the correction lens 132.

As described above, according to the first embodiment, the image capturing apparatus 100 can switch the control mode for the correction lens 132 between the blur correction mode and the object tracking mode. The image capturing apparatus 100 performs the electronic blur correction in the case of the blur correction mode, and does not perform the electronic blur correction in the case of the object tracking mode.

Thus, when an image capturing apparatus having an electronic blur correction function performs object tracking using its optical system such as the correction lens 132, the electronic blur correction function interfering with object tracking can be suppressed.

Note that although the output of the angular velocity sensor 101 is used in order to detect a shake of the image capturing apparatus 100 in the above description, this can be modified in various ways. For example, an acceleration sensor may be used. Furthermore, although the correction lens 132 is driven in order to perform the optical blur correction and the object tracking, there is no limitation thereto. For example, the image capturing apparatus 100 may perform the optical blur correction and the object tracking by driving the image sensor 133 in place of the correction lens 132. Alternatively, a method of using a prism in order to perform the optical blur correction and the object tracking, and the like can also be used. Any kind of method in which the positional relationship between the optical axis of the image capturing optical system 130 and the image sensor 133 is changed may be used to perform the optical blur correction and the object tracking.

Figure 3:
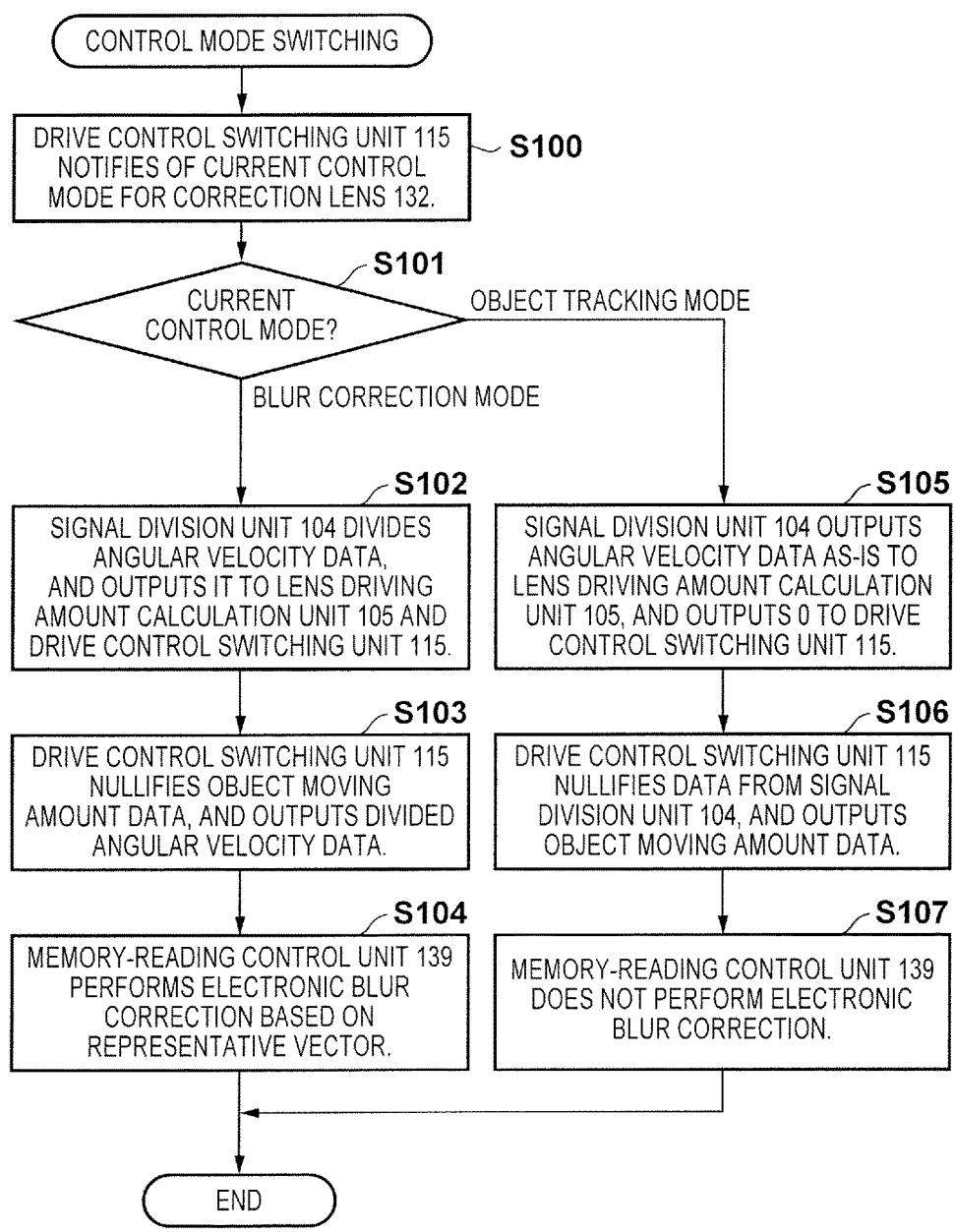
FIG. 3 is a flowchart showing processing executed by the image capturing apparatus 100 in accordance with switching of a control mode for a correction lens 132.

Moreover, the control of the memory-reading control unit 139 in step S107 in FIG. 3 is not necessarily limited to the control for reading out an image based on a fixed value. For example, the memory-reading control unit 139 may perform the electronic blur correction while setting the range within which the readout position can be changed in the object tracking mode to a range that is smaller than that in the blur correction mode. In other words, the memory-reading control unit 139 needs only make blur correction effect in the case of the object tracking mode smaller than that in the case of the blur correction mode by applying a predetermined gain that is smaller than 1 to the motion vector, and the blur correction effect does not need to be completely nullified. Even in this case, the motion vector based on background movement during the object tracking less affects the electronic blur correction, and accordingly the electronic blur correction function interfering with the object tracking can be suppressed to some extent. Various modifications described here also apply to the following embodiments.

Second Embodiment

Figure 4:
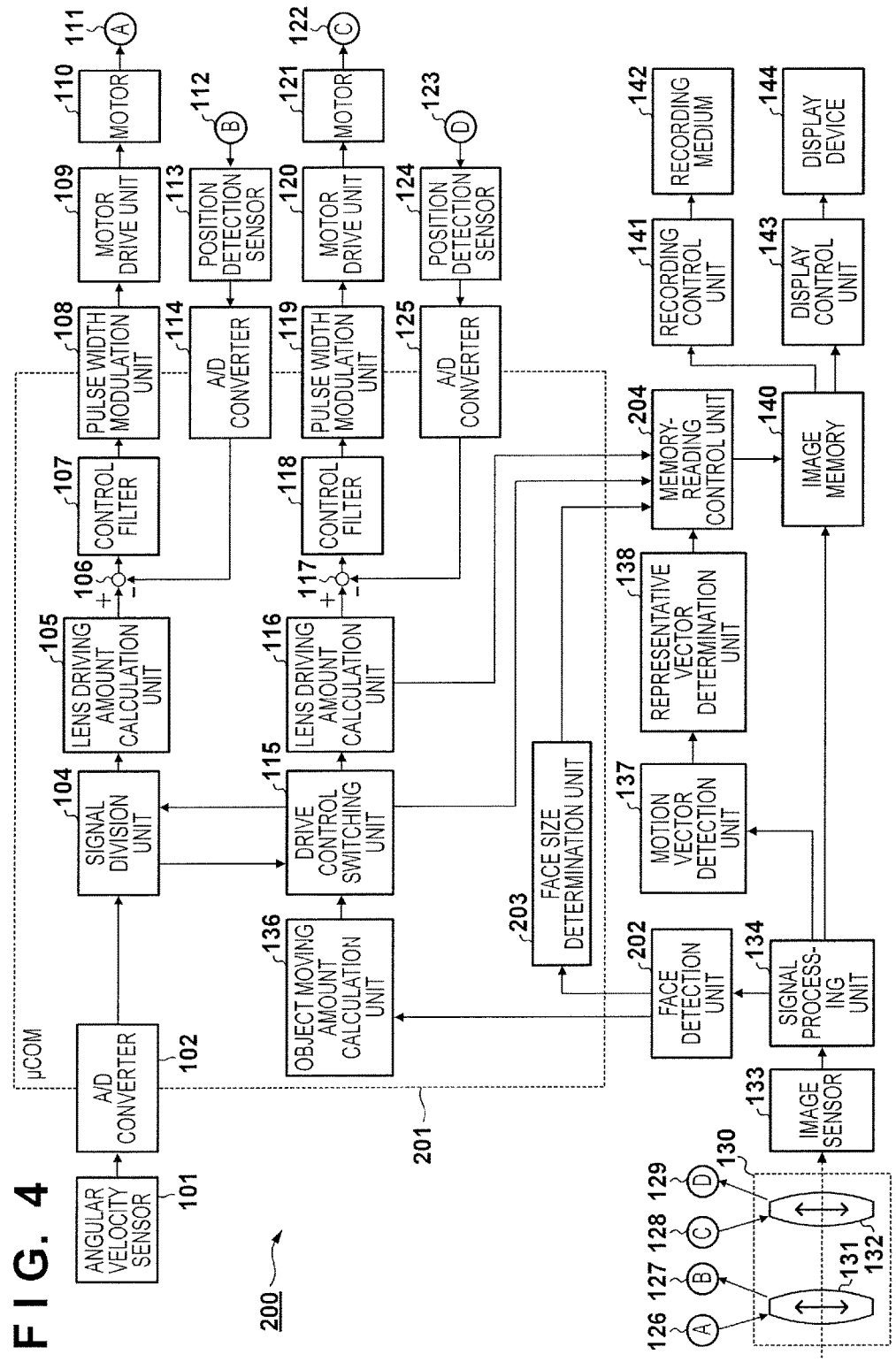
FIG. 4 is a block diagram showing a configuration of an image capturing apparatus 200 according to the second embodiment.

FIG. 4 is a block diagram showing a configuration of an image capturing apparatus 200 according to the second embodiment. In FIG. 4, the same configuration as that in FIG. 2 will be given the same reference numeral, and the description thereof will be omitted. In the first embodiment, in the case of the object tracking mode, the image capturing apparatus 100 reduces or nullifies the effect of the electronic blur correction. In contrast, in the second embodiment, the image capturing apparatus 200 performs correction processing using the representative vector in the case of the object tracking mode as well. However, although the details will be described later, this correction processing is similar to the electronic blur correction in the first embodiment in that the position of the image memory 140 from which the captured image is read out is changed, while the correction processing in the second embodiment has a function of improving object tracking accuracy, rather than correcting blur. This correction processing will be referred to as "electronic tracking correction".

In the image capturing apparatus 200 shown in FIG. 4, a μCOM 201 includes a face size determination unit 203, and a face detection unit 202 notifies the face size determination unit 203 of information regarding the face size based on detected face region information. A memory-reading control unit 204 is configured to receive the amount of driving of the correction lens 132 calculated by the lens driving amount calculation unit 116. The memory-reading control unit 204 changes processing content based on the determination result of which the memory-reading control unit 204 is notified by the face size determination unit 203.

The image capturing apparatus 200 performs the electronic blur correction as in the first embodiment in the case where the control mode for the correction lens 132 is the blur correction mode, and performs the electronic tracking correction in the case where the control mode for the correction lens 132 is the object tracking mode.

FIG. 5 is a flowchart showing electronic tracking correction processing executed by the image capturing apparatus 200. This flowchart replaces step S107 in FIG. 3. Initially, in step S200, the face detection unit 202 notifies the face size determination unit 203 of face size information, that is, the size of the face of a main object that occupies the captured image.

In step S201, the face size determination unit 203 determines whether or not the face size is larger than or equal to a threshold value, based on the face size information of which the face size determination unit 203 is notified by the face detection unit 202. If the face size is larger than or equal to the threshold value, the processing proceeds to step S202, and if the face size is smaller than the threshold value, the processing proceeds to step S203. Here, the threshold value is a value serving as a boundary indicating which of movement of the main object serving as a tracking object and a background position change more strongly contributes to the representative vector determined by the representative vector determination unit 138. That is to say, the threshold value is the face size of the object with which, among a plurality of motion vectors detected by the motion vector detection unit 137, the number of motion vectors representing object movement is larger than the number of motion vectors representing the background position change. Accordingly, if the face size of the main object is larger than or equal to the threshold value, the representative vector is calculated based mainly on the movement of the main object, and if the face size is smaller than the threshold value, the representative vector is calculated based mainly on the background position change.

In step S202, the memory-reading control unit 204 controls the position of the image memory 140 from which the captured image is read out, based on the representative vector. Since the representative vector is calculated based mainly on the movement of the main object, the electronic tracking correction that corrects a shift of the object position (i.e., error in the object tracking performed by the correction lens 132) is realized under this control.

On the other hand, in step S203, the memory-reading control unit 204 performs the electronic tracking correction, based on a difference between the representative vector and a lens driving amount of the correction lens 132 calculated by the lens driving amount calculation unit 116.

Processing in step S203 performed by the memory-reading control unit 204 will now be described in detailed with reference to FIGS. 6A to 6C. FIG. 6A shows the lens driving amount of the correction lens 132 calculated by the lens driving amount calculation unit 116. This lens driving amount is calculated based on the main object position, and corresponds to a target amount of the driving of the correction lens 132. By driving the correction lens 132 to perform tracking based on FIG. 6A, the position of a fixed object in the background changes as already described above, and the aforementioned background position change is detected as the representative vector shown in FIG. 6B. Here, the difference between the waveform of the lens driving amount in FIG. 6A and that of the representative vector in FIG. 6B represents the amount of tracking error that is caused since the driving of the correction lens 132 does not completely follow the lens driving amount. That is to say, a value obtained by subtracting the lens driving amount corresponding to a target amount the driving of the correction lens 132 from the representative vector appears as lens drive error in the form of the waveform shown in FIG. 6C. Note that although not shown in FIG. 4, the memory-reading control unit 204 performs processing for adjusting the unit of the lens driving amount to that of the representative vector, in order to perform the processing for subtracting the lens driving amount from the representative vector.

The memory-reading control unit 204 changes the position of the image memory 140 from which the captured image is read out, based on the lens drive error shown in FIG. 6C. It is thereby possible to correct error in the driving of the correction lens 132 (i.e., error in the object tracking) while avoiding the electronic blur correction that may possibly interfere with the object tracking performed by the correction lens 132.

As described above, according to the second embodiment, the image capturing apparatus 200 performs the electronic blur correction in the case of the blur correction mode, and performs the electronic tracking correction in the case of the object tracking mode. It is thereby possible to suppress the electronic blur correction function interfering with the object tracking, and further to correct error in the object tracking.

Third Embodiment

Figure 7:
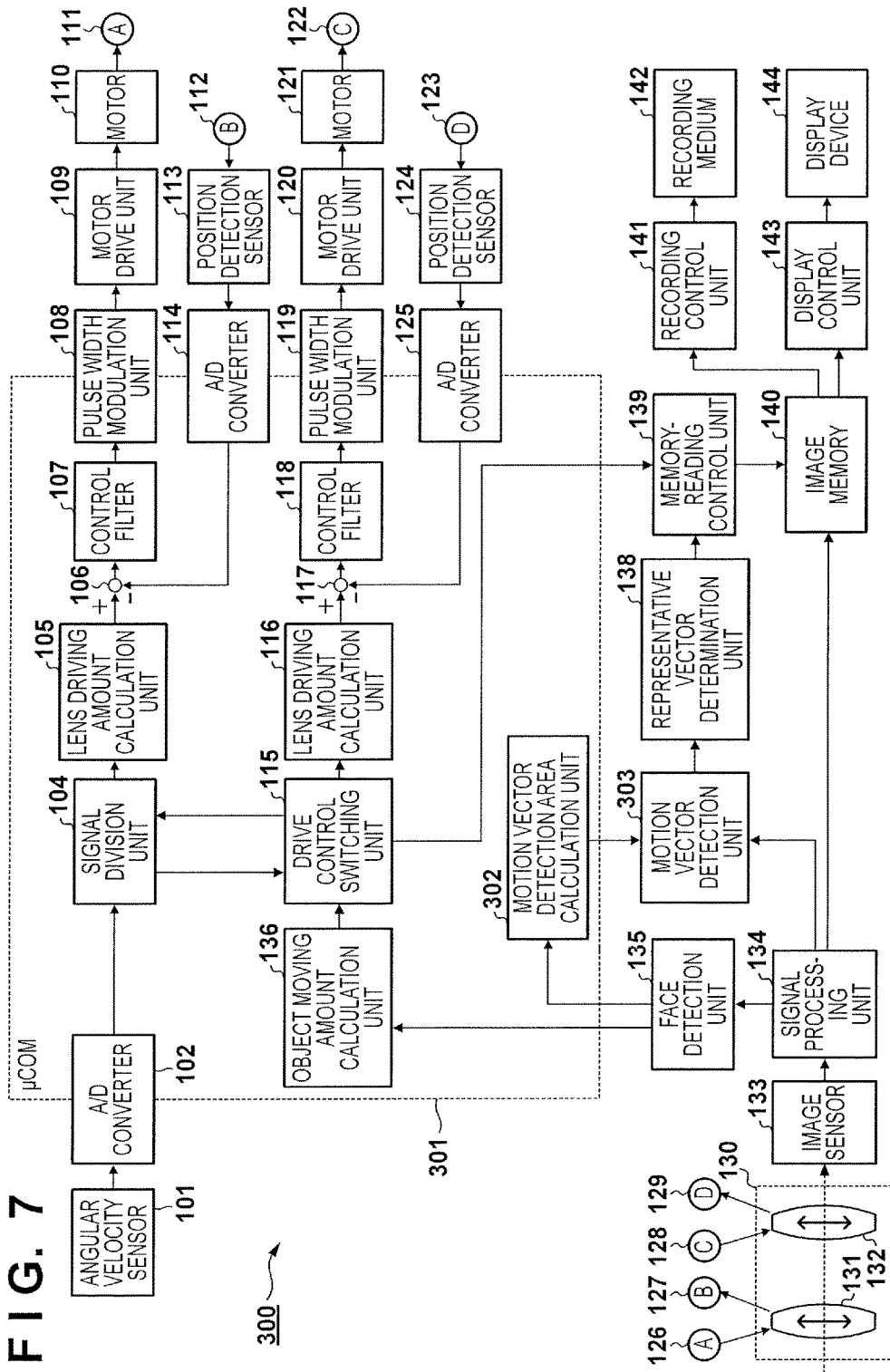
FIG. 7 is a block diagram showing a configuration of an image capturing apparatus 300 according to the third embodiment.

FIG. 7 is a block diagram showing a configuration of an image capturing apparatus 300 according to the third embodiment. In FIG. 7, the same configuration as that in FIG. 2 will be given the same reference numeral, and the description thereof will be omitted. The image capturing apparatus 300 realizes the electronic tracking correction using a different method from that of the image capturing apparatus 200 in the second embodiment.

Figure 8:
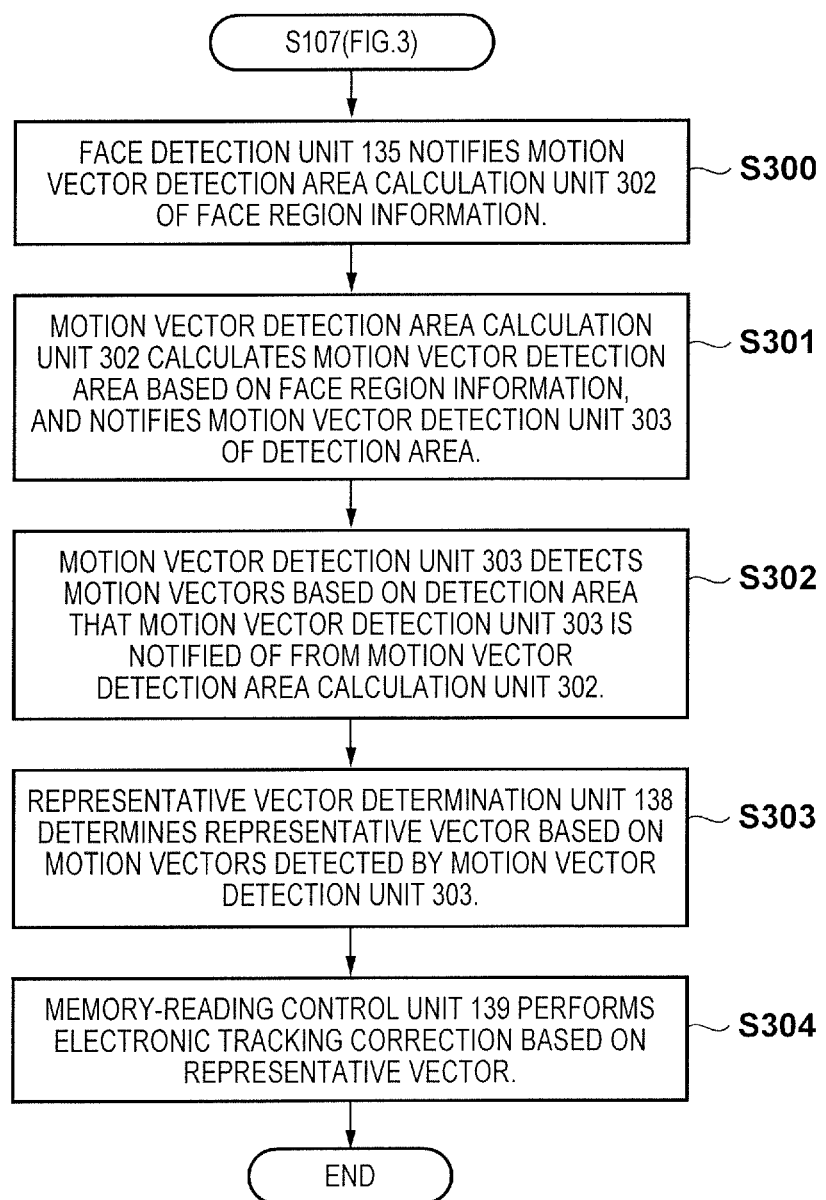
FIG. 8 is a flowchart showing electronic tracking correction processing executed by the image capturing apparatus 300.

In the image capturing apparatus 300 shown in FIG. 7, a μCOM 301 includes a motion vector detection area calculation unit 302. FIG. 8 is a flowchart showing electronic tracking correction processing executed by the image capturing apparatus 300. This flowchart replaces step S107 in FIG. 3.

In step S300, the face detection unit 135 detects a face region, and notifies the motion vector detection area calculation unit 302 of information of the detected face region. In step S301, the motion vector detection area calculation unit 302 calculates a motion vector detection area based on the face region information of which the motion vector detection area calculation unit 302 is notified in step S300, and notifies a motion vector detection unit 303 of the calculated motion vector detection area.

Figure 9A:
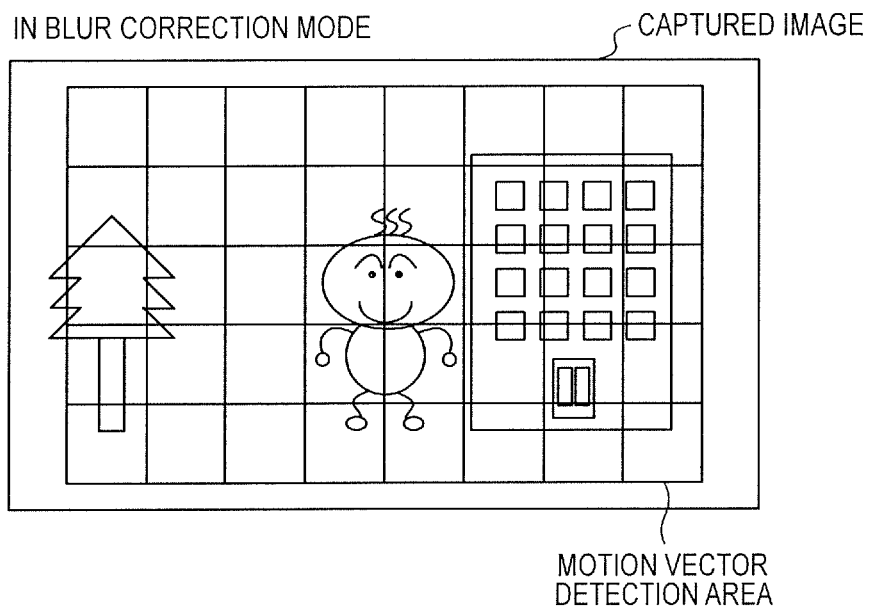
FIGS. 9A and 9B are diagrams showing motion vector detection areas in accordance with control modes for the correction lens 132.
Figure 9B:
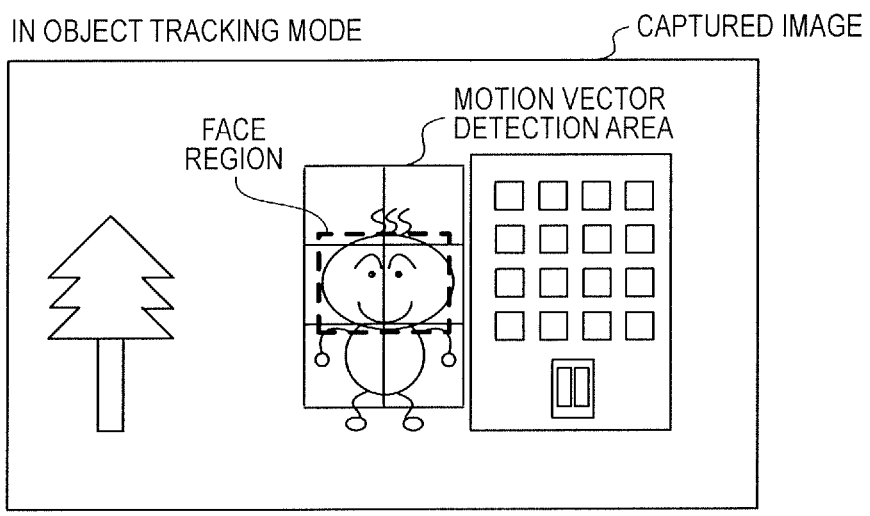

Exemplary motion vector detection areas calculated by the motion vector detection area calculation unit 302 are as shown in FIGS. 9A and 9B. If the control mode for the correction lens 132 is the blur correction mode, the detection area is substantially the whole area of a captured image as shown in FIG. 9A, and if the control mode for the correction lens 132 is the object tracking mode, the detection area is only around the face region as shown in FIG. 9B. The dotted-line frame denoted as "face region" in FIG. 9B indicates the face region detected by the face detection unit 135, and the motion vector detection area at this time is constituted only by six blocks including this face region. However, the number of blocks included in the detection area becomes extremely small depending on the location of the face region, which may possibly cause a decrease in detection accuracy. For this reason, in order to avoid the number of detected motion vectors becoming too small, the detection area may be constituted by blocks including the face region and blocks that are adjacent thereto. In other words, the motion vector detection area that is set when in the object tracking mode may be any area as long as the motion vector detection area includes the main object and is smaller than the motion vector detection area that is set when in the blur correction mode.

In another exemplary method for calculating the motion vector detection area, the motion vector detection area calculation unit 302 may determine the reliability of the motion vectors and determines the number of blocks and the block size, based on the reliability, to set the motion vector detection area.

In step S302, the motion vector detection unit 303 detects motion vectors within the motion vector detection area of which the motion vector detection unit 303 is notified by the motion vector detection area calculation unit 302. In step S303, the representative vector determination unit 138 determines the representative vector based on the motion vectors detected by the motion vector detection unit 303. The method for determining the representative vector is the same as that in the blur correction mode. In step S304, the memory-reading control unit 139 performs the electronic tracking correction based on the representative vector. The processing here is the same as that in step S202 in FIG. 2.

As described above, according to the third embodiment, in the case of the object tracking mode, the image capturing apparatus 300 detects the motion vectors based on the motion vector detection area calculated based on the face region, and performs the electronic tracking correction. It is thereby possible to suppress the electronic blur correction function interfering with the object tracking, and further to correct error in the object tracking.

Fourth Embodiment

Figure 10:
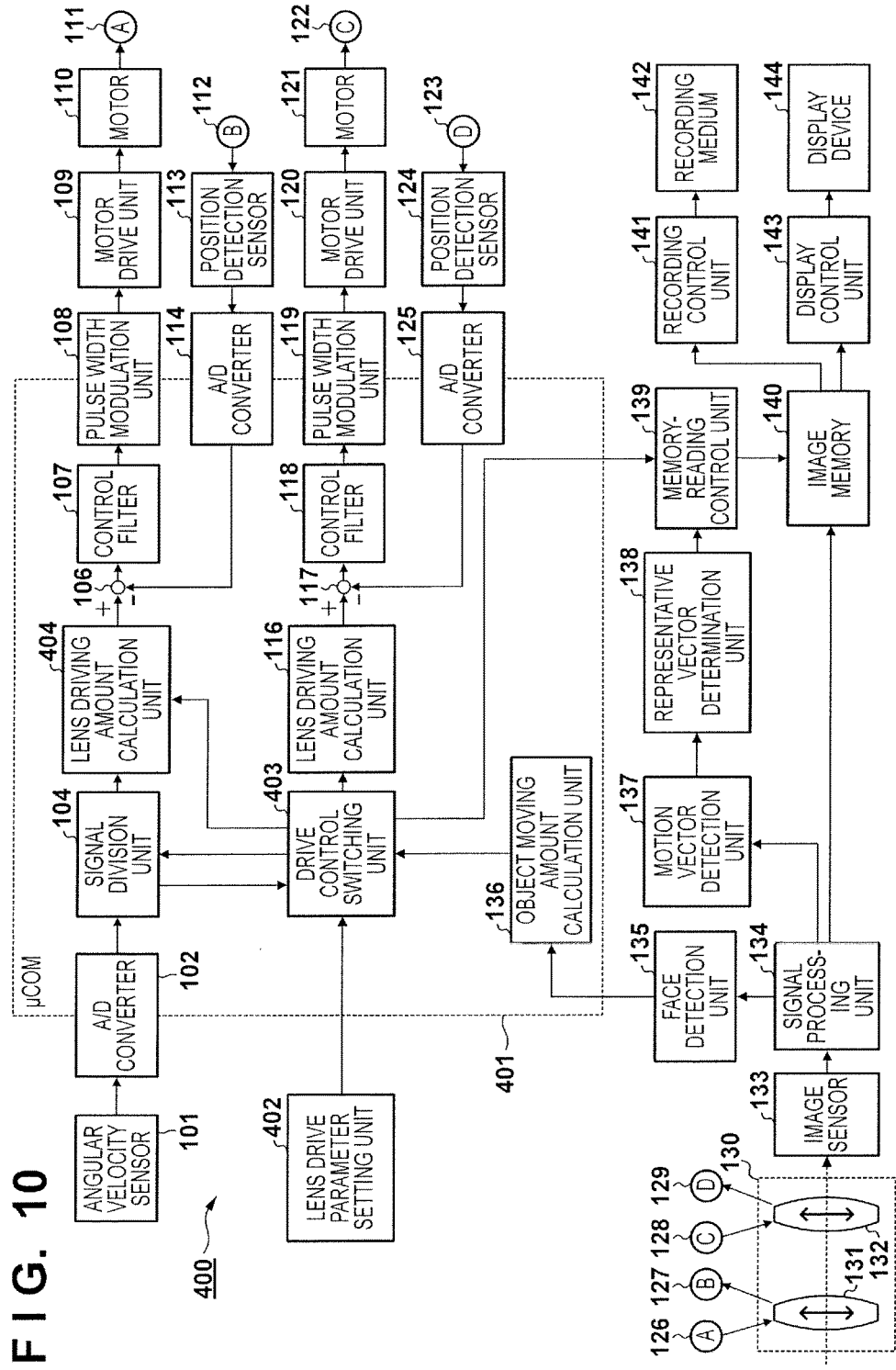
FIG. 10 is a block diagram showing a configuration of an image capturing apparatus 400 according to the fourth embodiment.

FIG. 10 is a block diagram showing a configuration of an image capturing apparatus 400 according to the fourth embodiment. In FIG. 10, the same configuration as that in FIG. 2 will be given the same reference numeral, and the description thereof will be omitted.

An image capturing apparatus 400 can also select a composition change mode, in addition to the blur correction mode and the object tracking mode, as the control mode for the correction lens 132. In the composition change mode, the image capturing apparatus 400 can execute composition change control for applying panning or tilting effect to a picture by moving the correction lens 132.

In the case of driving the correction lens 132 to perform the composition change, execution of the electronic blur correction interferes with the composition change. For this reason, in the case of the composition change mode, the image capturing apparatus 400 does not change the position of the image memory 140 from which the captured image is read out as in the case of the object tracking mode in the first embodiment, and furthermore stops the driving of the correction lens 131.

The image capturing apparatus 400 shown in FIG. 10 includes a lens drive parameter setting unit 402, and a drive control switching unit 403 in a µCOM 401 receives the output of the lens drive parameter setting unit 402. The drive control switching unit 403 can control a lens driving amount calculation unit 404 so as to set the lens driving amount to 0.

Figure 11:
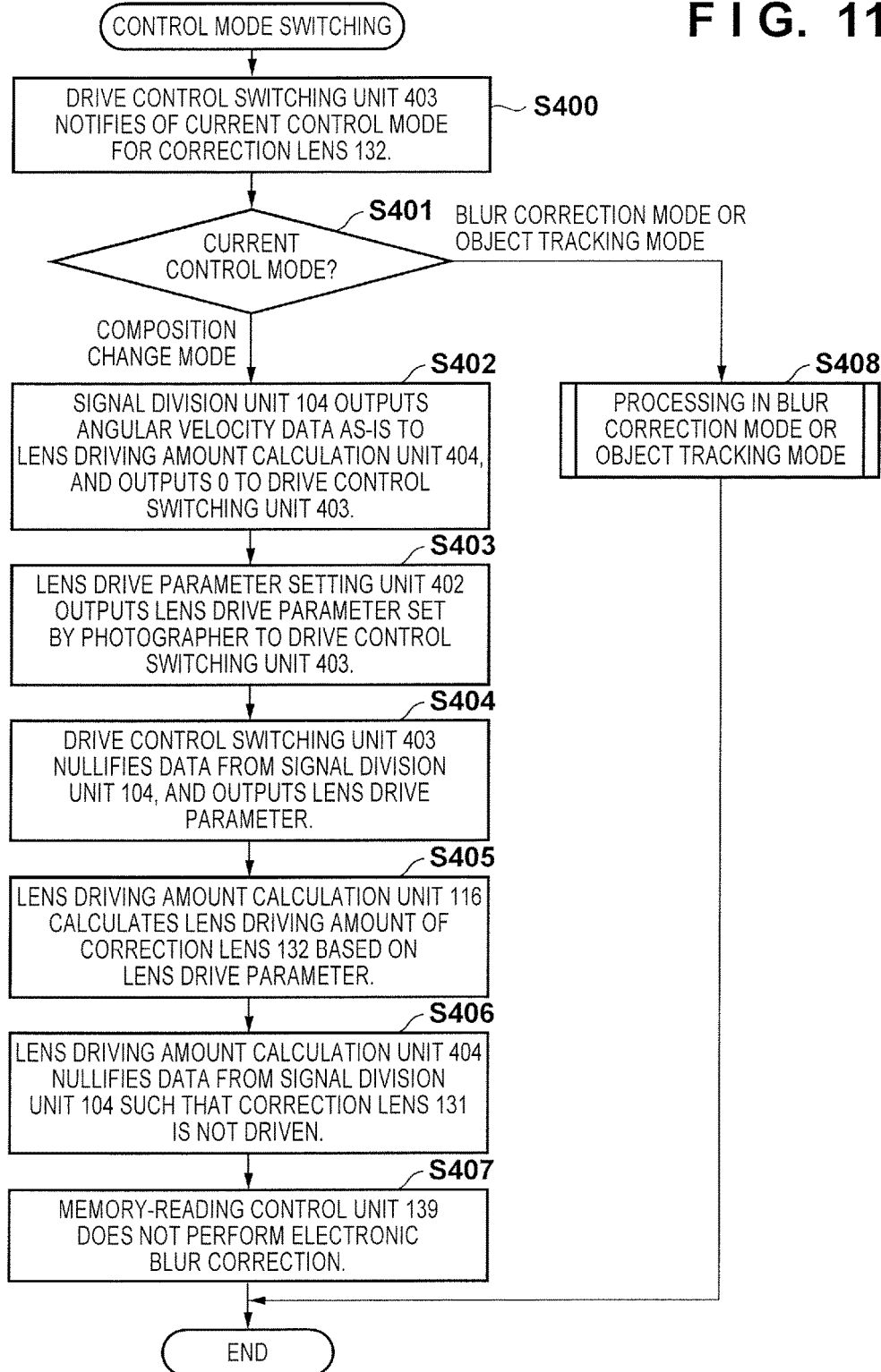
FIG. 11 is a flowchart showing processing executed by the image capturing apparatus 400 in accordance with switching of a control mode for the correction lens 132.

The processing executed by the image capturing apparatus 400 in accordance with the switching of the control mode for the correction lens 132 will now be described with reference to FIG. 11. Upon the drive control switching unit 403 switching the control mode for the correction lens 132 among the blur correction mode, the object tracking mode, and the composition change mode, the processing of the present flowchart is started.

In step S400, the drive control switching unit 403 notifies the signal division unit 104, the memory-reading control unit 139, and the lens driving amount calculation unit 404 of the current control mode for the correction lens 132.

In step S401, the processing branches depending on the current control mode. In the case of the composition change mode, the processing proceeds to step S402, and in the case of the blur correction mode or the object tracking mode, the processing proceeds to step S408. The processing in step S408 is the same as the processing described in the first to third embodiments.

In step S402, the signal division unit 104 starts the operation conforming to the control mode of which the signal division unit 104 is notified by the drive control switching unit 403 in step S400. Specifically, the signal division unit 104 outputs the angular velocity data supplied from the A/D converter 102 to the lens driving amount calculation unit 404 without dividing the angular velocity data. At this time, the signal division unit 104 outputs 0, an invalid value, or the like to the drive control switching unit 403 such that the drive control switching unit 403 does not use the output of the signal division unit 104.

In step S403, the lens drive parameter setting unit 402 outputs a lens drive parameter that is set by the photographer, to the drive control switching unit 403. Here, an exemplary lens drive parameter is a combination of a movement start position and a movement end position of the correction lens 132, and the speed at which the correction lens 132 moves from the movement start position to the movement end position. Another example is a combination of the movement start position, the movement speed, the movement direction, and the time taken to complete the movement of the correction lens 132. However, the parameters for satisfying the composition change that the photographer desires are not limited thereto.

In step S404, the drive control switching unit 403 starts the operation conforming to the control mode. Specifically, the drive control switching unit 403 nullifies data supplied from the signal division unit 104, and outputs the lens drive parameter that is output from the lens drive parameter setting unit 402, to the lens driving amount calculation unit 116.

In step S405, the lens driving amount calculation unit 116 calculates the lens driving amount of the correction lens 132, based on the lens drive parameter that is output from the drive control switching unit 403, and outputs the calculated lens driving amount to the subtracter 117. As a result of driving the correction lens 132 and deflecting its optical axis based on this lens driving amount, a picture can be shot as if the image capturing apparatus 400 is panned or tilted, even if shooting is performed in a state where the image capturing apparatus 400 is fixed.

In step S406, the lens driving amount calculation unit 404 starts the operation conforming to the control mode of which the lens driving amount calculation unit 404 is notified by the drive control switching unit 403 in step S400. Specifically, the lens driving amount calculation unit 404 nullifies the angular velocity data supplied from the signal division unit 104 and outputs an arbitrary fixed value as the lens driving amount to the subtracter 106, in order not to interfere with the composition change performed by the correction lens 132. However, the processing in step S406 is not limited thereto as long as the processing is for stopping the driving of the correction lens 131. For example, the signal division unit 104 may output, upon receiving a notification from the drive control switching unit 403, 0, an arbitrary fixed value, invalid data, or the like to both the drive control switching unit 403 and the lens driving amount calculation unit 404. Alternatively, processing for stopping the driving of the lens may be performed by the control filter 107 or the pulse width modulation unit 108. Furthermore, the structure of the correction lens 131 may include a lens fixation member, and in the case of the composition change mode, the correction lens 131 may be fixed by the lens fixation member.

In step S407, the memory-reading control unit 139 starts the operation conforming to the control mode of which the memory-reading control unit 139 is notified by the drive control switching unit 403 in step S400. Specifically, the memory-reading control unit 139 does not cause the electronic blur correction (and the electronic tracking correction) to be performed. That is to say, in order that the position from which the image is read out from the image memory 140 is not changed, the memory-reading control unit 139 sets a predetermined fixed position as the image readout position. As a result of stopping the electronic blur correction and the electronic tracking correction through the processing in step S407, the composition change performed by the correction lens 132 can be prevented from being interfered with. Note that, as in step S107 in FIG. 3, the memory-reading control unit 139 may perform the electronic blur correction after reducing correction effect by applying a predetermined gain that is smaller than 1 to the representative vector so as to make the range within which the readout position can be changed smaller than that in the blur correction mode, instead of fixing the image readout position.

As described above, according to the fourth embodiment, the image capturing apparatus 400 can also select the composition change mode, in addition to the blur correction mode and the object tracking mode, as the control mode for the correction lens 132. The image capturing apparatus 400 does not perform the electronic blur correction in the case of the composition change mode.

Thus, when an image capturing apparatus having an electronic blur correction function performs composition change using an optical system such as the correction lens 132, the electronic blur correction function interfering with the composition change can be suppressed.

Note that the image capturing apparatus 400 may stop the correction lens 132 and perform the composition change using the correction lens 131, instead of stopping the correction lens 131 and performing the composition change using the correction lens 132.

Fifth Embodiment

FIG. 12 is a block diagram showing a configuration of an image capturing apparatus 500 according to the fifth embodiment.

In the fifth embodiment, a configuration in which the representative vector is also used for the driving of the correction lens 132 is added to the image capturing apparatuses in the above-described first to forth embodiments. FIG. 12 shows only the characteristic part of the fifth embodiment, and the blocks that are not different from those in the configurations described in the above embodiments are omitted or given the same reference numerals, and the description thereof will be omitted.

A μCOM 501 in the image capturing apparatus 500 includes a lens driving amount conversion unit 504 and an adder 505, and a drive control switching unit 502 notifies the lens driving amount conversion unit 504, as well as the memory-reading control unit 139, of the control mode.

A representative vector determination unit 503 determines the representative vector from among the motion vectors detected by the motion vector detection unit 137, and outputs the representative vector to the lens driving amount conversion unit 504 and the memory-reading control unit 139.

The lens driving amount conversion unit 504 converts the representative vector into a correction amount by which the correction lens 132 (see FIG. 2) is driven. However, the conversion processing performed by the lens driving amount conversion unit 504 includes not only simple unit conversion processing but also filter calculation processing, such as integration and phase matching.

The output of the lens driving amount conversion unit 504 is defined below as a vector lens driving amount. Feedback control using vectors that are different from those in the system of feedback from the position detection sensor 124 is realized by adding the adder 505 downstream of the lens driving amount calculation unit 116.

Here, in the case where the control mode of which the lens driving amount conversion unit 504 is notified by the drive control switching unit 502 is not the blur correction mode, the lens driving amount conversion unit 504 does not cause the driving of the correction lens 132 based on the vector to be performed (or the lens driving amount conversion unit 504 reduces the amount of the driving of the correction lens 132 based on the vector). That is to say, the lens driving amount conversion unit 504 reduces correction effect by applying a predetermined gain that is smaller than 1 to the vector lens driving amount so as to output, to the adder 505, 0 or a value smaller than the value of the output in the blur correction mode. With this processing, it is possible to suppress erroneous blur correction caused by vectors generated by a background position change occurring due to the object tracking of the correction lens 132 when in the object tracking mode.

In the first to fourth embodiments, suppressing of the electronic blur correction function interfering with the object tracking or the composition change has been mainly described. However, as is clear from the fifth embodiment, the blur correction function is not limited to electronic one, and regardless of the electronic or optical blur correction function, it is possible to suppress the image blur correction function interfering with the object tracking or the composition change.

Other Embodiments

In the above embodiments, the description has been given to the image capturing apparatus having two correction lenses, namely the correction lens 131 and the correction lens 132. However, each image capturing apparatus does not have to include the correction lens 131. That is to say, each image capturing apparatus may switch the control mode for a single correction lens between the blur correction mode and the object tracking mode (and also the composition change mode in the case of the fourth embodiment).

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-197506 filed on Sep. 24, 2013 and 2014-149163 filed on Jul. 22, 2014 which are hereby incorporated by reference herein in their entirety.

What is claimed is:

1. An image capturing apparatus comprising:
an object detection unit configured to detect a predetermined object in a captured image that is captured by an image sensor;
a movement amount acquisition unit configured to acquire an amount of movement of the predetermined object that moves in an image capturing semen, from two captured images that are captured by the image sensor;
object tracking unit configured to suppress the amount of movement of the predetermined object the image capturing screen, by moving an optical element in a direction that is different from a direction of an optical axis of an image capturing optical system that guides a light beam toward the image sensor, the optical element constituting the image capturing optical system;
a motion vector detection unit configured to compare two captured images that are captured by the image sensor and detect a motion vector indicating an image blur amount;
an image blur correction unit configured to correct image blur, based on the motion vector;
a switching unit configured to switch whether or not to perform object tracking using the object tracking unit in accordance with a user's manual instruction,
wherein the object tracking unit suppresses the amount of movement of the predetermined object in the image;

capturing screen even when the image capturing apparatus is not moving and the predetermined object is moving, and wherein the image blur correction unit makes effect of the image blur correction in a case of performing the object tracking smaller than effect of the image blur correction in a case of not performing the object tracking.

2. The image capturing apparatus according to claim 1, wherein the image blur correction unit makes a gain of a correction value in the image blur correction in a case of performing the object tracking smaller than a gain of a correction value in the image blur correction in a case of not performing the object tracking.

3. The image capturing apparatus according to claim 1, wherein the image blur correction of the image blur correction unit is electronic blur correction control in which a position from which the captured image is read out is controlled.

4. An image capturing apparatus comprising:
an object detection unit configured to detect predetermined object in a captured image that is captured by an image sensor;
a movement amount acquisition unit configured to acquire an amount of movement of the predetermined object that moves in an image capturing screen, from two captured images that are captured by the sensor:
an object tracking unit configured to suppress the amount of movement of the predetermined object in the image capturing screen, by moving an optical element in a direction that is different from a direction of an optical axis of an image capturing optical system that guides a light beam toward the image sensor, the optical element constituting the capturing optical system;
a motion vector detection unit configured to compare two captured images that are captured by the image sensor and detect a motion vector indicating an image blur amount
an image blur correction unit configured to correct imaged blur, based on the motion vector:
a switching unit configured to switch whether or not to perform object tracking using the object tracking unit: and
a determination unit configured to determine whether or not a size of the predetermined object is larger than or equal to a threshold value,
wherein the image blur correction unit makes effect of the image blur correction in a case of performing the object tracking smaller than effect of the image blur correction in a case of not performing the object tracking, and
wherein if the size of the predetermined object is larger than or equal to the threshold value, the image blur correction unit does not make the effect of the image blur correction smaller even in a case where control for performing the object tracking is selected by the switching unit.

5. An image capturing apparatus comprising:
an object detection unit configured to detect a predetermined object in a captured image that is captured by an image sensor;
a movement amount acquisition unit configured to acquire an amount of movement of the predetermined object that moves in an image capturing screen, from two captured images that are captured by the image sensor;
an object tracking unit configured to suppress the amount of movement of the predetermined object in the image capturing screen, by moving an optical element in a direction that is different from a direction of an optical axis of an image capturing optical system that guides a light beam toward the image sensor, the optical element constituting the image capturing optical system;
a motion vector detection unit configured to compare two captured images that are captured by the image sensor and detect a motion vector indicating an image blur amount;
an image blur correction unit configured to correct image blur, based on the motion vector;
a switching unit configured to switch whether or not to perform object tracking using the object tracking unit; and
a setting unit configured to set an area for detecting the motion vector using the motion vector detection unit, in a captured image that is captured by the image sensor,
wherein the image blur correction unit makes effect of the image blur correction in a case of performing the object tracking smaller than effect of the image blur correction in a case of not performing the object tracking, and
wherein the setting, unit sets the area for detecting the motion vector in a case of performing the object tracking to be smaller than the area for detecting the motion vector in a case of not performing the object tracking.

6. An image capturing method comprising:
detecting a predetermined object in a captured image that is captured by an image sensor;
acquiring an amount of movement of the predetermined object that moves in an image capturing screen, from two captured images that are captured by the image sensor,
suppressing the amount of movement of the predetermined object in the image capturing screen, by moving an optical element in a direction that is different from a direction of an optical axis of an image capturing optical system, that guides a light beam toward the image sensor, the optical element constituting the image capturing optical system;
comparing two captured images that are captured by the image sensor and detecting a motion vector indicating an image blur amount;
correcting image blur, based on the motion vector; and
switching whether or not to perform object tracking in the tracking in accordance with a user's manual instruction,
wherein in the tracking, the amount of movement of the predetermined object in the image capturing screen is suppressed even when the image capturing apparatus is not moving and the predetermined object is moving, and
wherein in the correcting, effect of the image blur correction in a case of performing the object tracking is made smaller than effect of the image blur correction in a case of not performing the object tracking.

7. An image capturing method comprising:
detecting a predetermined object in a captured image that is captured by an image sensor;
acquiring an amount of movement of the predetermined object that moves in an image capturing screen, from two captured images that are captured by the image sensor;
suppressing the amount of movement of the predetermined object in the image capturing screen, by moving an optical element in a direction that is different from a direction of an, optical axis of an image capturing optical system that guides a light beam o d the image sensor, the optical element constituting the image capturing optical system:

comparing two captured images that are captured by the image sensor and detecting a motion vector indicating an image blur amount;

correcting image blur, based on the motion vector;

switching whether or not to perform object tracking in the tracking: and determining whether or not a size of the predetermined object is larger than or equal to a threshold value, wherein in the correcting, effect of the image blur correction in a case of performing the object tracking is made smaller than effect of the image blur correction in a case of not performing the object tracking, and wherein if the size of the predetermined object is larger than or equal to the threshold value, the correcting does not make the effect of the image blur correction smaller even in a case where control for performing the object tracking is selected by the switching.

8. An image capturing method comprising:

detecting a predetermined object in a captured image that is captured by an image sensor;

acquiring an amount, of movement of the predetermined object that moves in an image capturing screen, from two captured images that are captured by the image sensor;

suppressing the amount of movement of the predetermined object in the image capturing screen, by moving an optical element in a direction that is different from a direction of an optical axis of an image capturing optical system that guides a light beam toward the image sensor, the optical element constituting the image capturing optical system;

comparing two captured images that are captured by the image sensor and detecting a motion vector indicating an image blur amount;

correcting image blur, based on the motion vector;

switching whether or not to perform object tracking in the tracking; and setting an area for detecting the motion vector in the detecting, in a captured image that is captured by the image sensor, wherein in the correcting, effect of the image blur correction in a case of performing the object tracking is made smaller than effect of the image blur correction in a case of not performing the object tracking, and wherein the setting sets the area for detecting the motion vector in a case of performing the object tracking to be smaller than the area for detecting the motion vector in a case of not performing the object tracking.

* * * * *